Patented Aug. 5, 1952

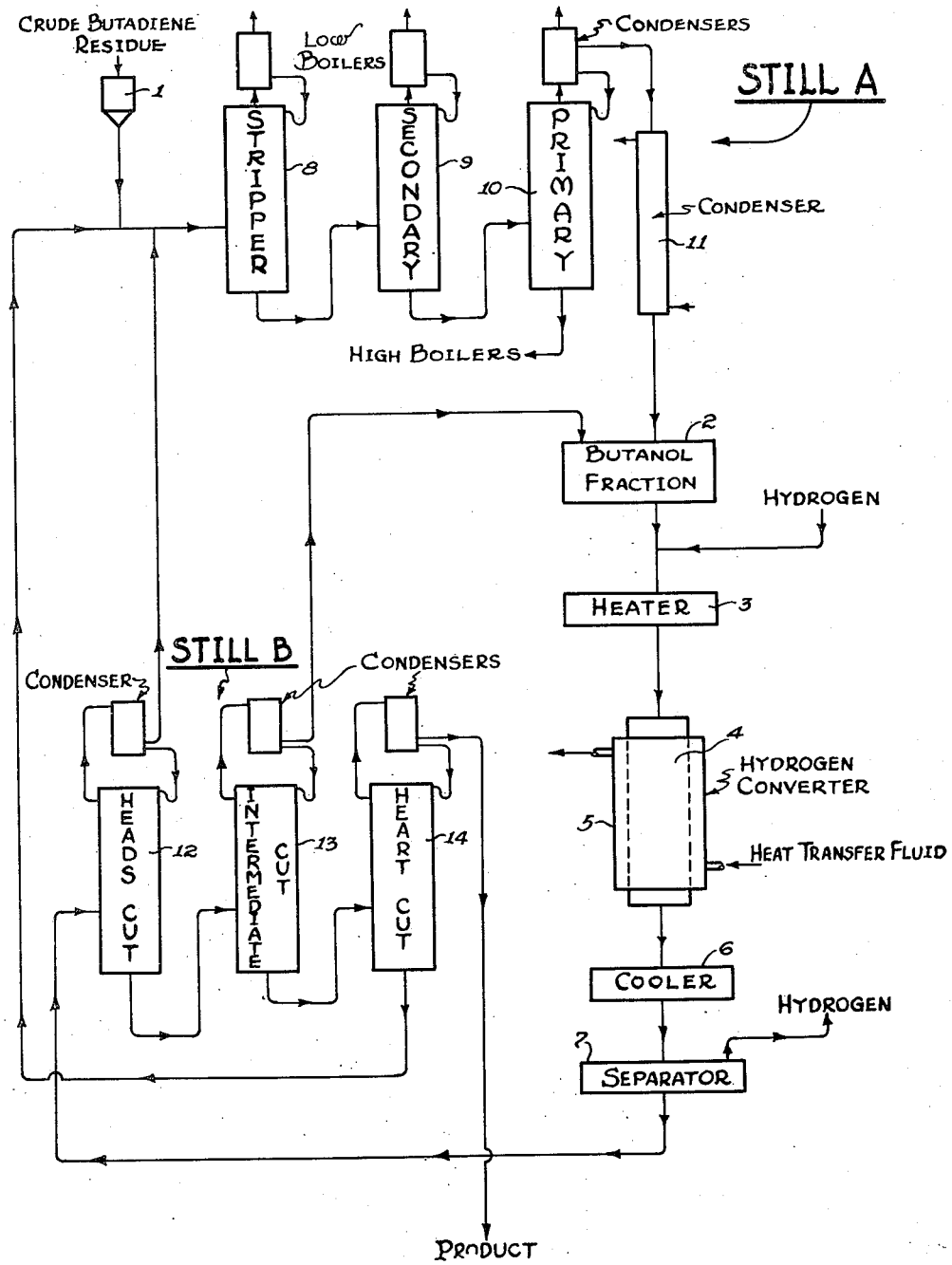

2,606,211

UNITED STATES PATENT OFFICE 2,606,211

RECOVERY OF N-BUTANOL FROM BUTADIENE RESIDUE

Leslie W. Royer, Aliquippa, and Robert Louis Iverson, Beaver Falls, Pa., assignors to Koppers Company, Inc., Pittsburgh, Pa., a corporation of Delaware Application August 3, 1945, Serial No. 608,758

2 Claims. (Cl. 260—643)

This invention relates to chemical process and is particularly directed to the recovery of n-butanol as a by-product of the manufacture of butadiene from ethyl alcohol.

In the conversion of ethyl alcohol to butadiene, there is obtained as a by-product a heavy oil, hereinafter referred to as butadiene residue, containing a substantial amount of n-butanol. The principal constituents of the converter product are butadiene, unconverted ethyl alcohol and acetaldehyde. In the separating and refining of these products, the butadiene as a product, and the ethyl alcohol and acetaldehyde for recycling in the process, there is obtained a substantial quantity of this butadiene residue which is made up largely of higher alcohols such as n-butanol and crotonyl alcohol, varying amounts of water, higher boiling hydrocarbons, and smaller quantities of higher aldehydes, such as butyr- and crotonaldehydes and various esters.

This invention has for its objects to provide for the recovery of butanol from butadiene residue; to provide for the recovery as n-butanol of crotonyl alcohol and butyr- and crotonaldehyde from butadiene residue; to reduce to insignificant amounts the content of unsaturates, aldehydes and esters in the n-butanol thus recovered; to avoid the disadvantages of any prior art process and to obtain advantages as will appear hereinafter. Other objects will appear as the description proceeds.

These objects are accomplished in the present invention by hydrogenating unsaturated compounds in the butadiene residue and fractionating to recover n-butanol. By means of the combination of hydrogenation and fractionation of the butadiene residue, low boiling and high boiling materials may be eliminated, crotonyl alcohol and butyr- and crotonaldehydes converted to n-butanol, the content of unsaturates, aldehydes and esters reduced to insignificant amounts and an n-butanol recovered which is sufficiently free of contaminants to meet specifications for commercially pure butanol.

In carrying out the processes of the invention, it is desirable to treat the butadiene residue to eliminate low boiling and high boiling materials (relative to the boiling point of n-butanol), acidic materials and such other materials as may be easily separated from the butadiene residue. The butadiene residue may be washed free of ethyl alcohol and other water-soluble products. The wash may include an alkaline wash to remove acidic products. The washed or unwashed butadiene residue may be subjected to suitable fractional distillation to separate the low boiling and high boiling fractions and to recover the fraction boiling substantially as n-butanol. The n-butanol fraction thus recovered may then be passed over a hydrogenation catalyst in the presence of hydrogen at a reactive temperature below the boiling point and again fractionated to recover the fraction boiling substantially as n-butanol. While it is possible to hydrogenate the crude butadiene residue and thereafter to separate the undesirable constituents by fractionation, it has been found that substantially equivalent yields and a product of higher purity may be obtained by subjecting the butadiene residue to fractionation before the hydrogenation step in order that the low boiling and high boiling fractions may be eliminated before exposure to hydrogenation. Unsaturate compounds and aldehydes which would otherwise reduce the capacity of the converter are thus eliminated. Moreover, high and low boiling fractions tend materially to decrease the catalytic activity and require higher hydrogenation pressures.

It is known in the art that n-butanol can be obtained from butadiene residue by repeatedly distilling it to obtain a narrow cut boiling substantially as n-butanol and subjecting this narrow cut to liquid or vapor phase hydrogenation to hydrogenate whatever unsaturated compounds are contained therein. See for example Ushakov et al. Sintet, Kauchuk 1934 No. 2, 7–9 and Kezanski, Journal of Applied Chemistry (USSR) 6, 266 (1933). We have now found that improved results are obtained by taking a relatively wide cut in the first instance fractionating this relatively wide cut and then subjecting the hydrogenated cut to careful fractionation to obtain a narrow cut boiling substantially as n-butanol. We have found that the extensive distillation required to recover a narrow boiling fraction, i. e. one boiling substantially as n-butanol, from the crude butadiene residue is undesirable because repeated distillation in the presence of substantial quantities and large varieties of unsaturates tends to promote decomposition. This in turn tends to foul the catalyst in the hydrogenation and to make it difficult to obtain a water white product.

The invention may be more fully understood by reference to the accompanying flow sheet illustrating a typical embodiment of the invention. Crude butadiene residue after washing to remove ethanol and other water-soluble products is passed through an alkaline scrubber 1 to remove any acidic material which may be present. The washed and neutralized crude butadiene residue is then passed on to a still A where it is subjected to fractionation to eliminate low boilers and high boilers and to recover in a receiver 2 a fraction boiling substantially as n-butanol. This n-butanol fraction, containing crotonyl alcohol and C-4 aldehydes, is admixed with hydrogen and passed through a suitable heater 3 where it is heated to a temperature suitable for initiating hydrogenation in a hydrogenation converter 4. The hydrogenation converter is provided with a suitable jacket 5 for circulating a heat transfer fluid in heat exchange relation to the catalyst in order to keep the temperature in the converter below the boiling point of the n-butanol fraction. The hydrogenated product is passed through a cooler 6, is degasified in a gas separator 7 and passed on to still B for further fractionation. The low boilers are taken off in two cuts both of which contain a substantial proportion of n-butanol. The heads cut which contains the lowest boiling materials is fed back to still A in order to purge the low boilers and recover the n-butanol. The intermediate cut is fed back to the receiver 2 and passed on with the n-butanol fraction to hydrogenation. The heart cut, the fraction boiling substantially as n-butanol, is recovered as product.

The following is illustrative of a typical embodiment of the invention—starting with a crude butadiene residue which, after washing, has the following average composition and boiling range:

| | Percent |
|---|---|
| Boiling below 80° | 2 |
| Boiling below 100° | 10.0 |
| Boiling below 117° | 16.2 |
| N-butanol, 117–118° | 23.5 |
| Boiling above 119° | 60.3 |
| Traces of organic acids. | |

The crude is pumped through a saturated solution of sodium carbonate in order to remove any organic acid remaining and the neutralized crude pumped continuously to the still A. This still suitably is made up of three columns serially connected. The first of which, stripper 8, is operated at atmospheric pressure to strip off all the very light material; the second of which, secondary 9, is operated at reduced pressure to strip all the remaining light material boiling below the n-butanol fraction and the third of which, primary 10, is operated at still further reduced pressure to recover the n-butanol fraction.

The stripper 8 suitably may be made up of a preheater and flash tank in which the crude butadiene residue is heated to 110–115° C. and fed to a tank open to the atmosphere where the very light ends are flashed off. Alternatively the crude may be fed to the 11th tray of a 32-tray column operating at atmospheric pressure with a base temperature of 115° and a reflux ratio of 2–1.

The bottoms from the stripper flows by pressure difference to the secondary column 9, which suitably is a 36-tray column. The feed is to the 20th plate. The column is operated at a base temperature sufficient to prevent the light ends from getting into the bottom. The pressure at the top of the column is maintained at about 125 mm. Hg absolute and that at the bottom from 195–205 mm. Hg depending upon the feed rate. The base temperature at 200 mm. Hg to maintain adequate stripping is 100–105° C. A high reflux ratio, about 20–1, is carried in order to minimize loss of n-butanol in the overhead. The head temperature varies from about 54 to 60° C.

The bottoms from the secondary are fed by pump to the primary column 10 which suitably is a 36-tray column. The feed is to the 10th tray. In this column the n-butanol is separated from the heavy ends of the crude butadiene residue. For this reason, the column is operated with a large enriching section and high reflux ratios up to 25–1. The pressure on the head of the column is 30 mm. Hg absolute and the base pressure varies from 80 to 95 mm. Hg depending upon the vapor load. The second purpose of the column is to strip all of the n-butanol from the residual oil and for this reason the base temperature is carried at 95–110° C. at this high vacuum. The head temperature of the column is 48° C. The residual oil flows from the base of this column and is discharged to storage. The overhead from the column is condensed by condenser 11 and collected in the receiver 2 from which it is fed to the hydrogenation converter 4. It has the following average composition:

| | |
|---|---|
| Color | Light yellow |
| Butanol content | 80–94% |
| Aldehydes | 1.3–2.5% |
| Esters | 2–3.5% |
| Bromine No | 20–50 |
| Boiling range | 116 to 125° C. |

A summary of the average operating conditions for this system is given below:

| | Stripper | Secondary | Primary |
|---|---|---|---|
| Feed—g. p. h | 450 | 400–420 | 320–340 |
| Reflux—g. p. h | 100 | 1,200 | 2000 |
| Product—g. p. h | 50 | 60–65 | 70–50 |
| Residues—g. p. h | 400 | 335–340 | 250–260 |
| Reflux ratio | 2–1 | 20–1 | 25 to 1 |
| Head temperature—° C | 70–75 | 55–60 | 48 |
| Head pressure—mm. Hg | Atm. | 125 Abs. | 33 Abs. |
| Base temperature—° C | 115 | 100–105 | 95–105 |
| Base pressure—mm. Hg | [1] 25–35 gauge | 195–205 abs. | 80–95 abs. |
| Steam press. on reboilers—p. s. i. | 50 | 35 | 35 |

[1] I. e. 25–35 mm. Hg above 1 atmosphere.

The crude butanol is pumped to the hydrogenation converter 4 through the heater 3. A steam of 99% hydrogen is mixed with the crude butanol just before it enters the heater. The mixture, which suitably has a ratio of 10–25 cubic feet of hydrogen per gallon of n-butanol fraction, is heated to 95° C. The mixture then enters the top of the converter, passes down over the catalyst and out the bottom. The catalyst consists of 2–4 mesh lumps of Raney-nickel (53% Al, 47% Ni) which has previously been activated.

The activation of the catalyst consists of circulating a dilute solution of caustic (1–1½%) through the converter until a certain percent of the aluminum has been dissolved. The following equation represents the reaction:

$$2NaOH + 2Al + 2H_2O = 2NaAlO_2 + 3H_2$$

The reaction is very exothermic and the liberated heat is removed by circulating water through a jacket around the converter. Fifteen percent of the aluminum is dissolved on the first activation, 7% on each additional reactivation. When about 65% of aluminum is dissolved, the catalyst is beyond reactivation and must be deactivated and dumped. A fresh charge is then added and the process repeated.

From the dissolution of the aluminum a finely divided network of nickel results. The nickel in this state is highly active and brings about the addition of hydrogen to the unsaturates and aldehydes. The mixture of semi-refined butanol and unreacted hydrogen passes out the bottom of the converter at 105–115° C. There is a slight rise in temperature as the mixture passes down through the catalyst due to the exothermic reaction (hydrogenation). The jacketed vessel can be heated with steam to maintain temperature up to 150° C. although ordinarily this will not be necessary. The hydrogenated mixture passes through the cooler 6 which lowers the temperature to 30–40° C. and then into the separator 7. The hydrogen is bled off to stack with suitable back pressure regulation to maintain the desired proportion of hydrogen to butanol in the converter. The semi-refined butanol is then passed on to the final distillation. At this point it has the following average composition:

| | |
|---|---|
| Color | Water white |
| Butanol content | 80–93% |
| Aldehydes | Less than 1% |
| Esters | 2–3.5% |
| Bromine No | 0.5–3.0 |
| Boiling range | 110–125° C. |

The following is a summary of the average operating conditions:

Average system pressure, 40–47 p. s. i.

Average flow:
 Butanol, 90–110 g. p. h.
 Hydrogen, 1750–2000 c. f. h.
Catalyst volume, 22 cubic feet
Temperature inlet to heater 3, 20–35° C.
Temperature outlet from heater 3, 90–95° C.
Temperature outlet from converter 4, 105–115° C.
Temperature outlet from cooler 6, 30–40° C.
Temperature gas from separator 7, 35–40° C.

The semi-refined butanol is now distilled in still B to recover a suitably refined product. The three columns, 12, 13 and 14 illustrated, may conveniently be a single column operated batch-wise. About ten trays per column is suitable. The semi-refined butanol is distilled at atmospheric pressure with a high reflux ratio about 25–1. The heads cut (105 to 114° C.) amounts to 5–10%. It contains approximately 65% butanol and is fed back to the first still A in order to recover the butanol. The intermediate cut, intermediate between the heads cut and the heart cut (112–116° C.), amounts to 10 to 20%. It may be returned to the butanol fraction in the receiver 2 for rehydrogenation or may be redistilled in a subsequent batch distillation of the semi-refined butanol. The residue is returned to still A, after about three batches in batch distillation. The heart cut, that boiling substantially as n-butanol (115° to 118° C.), has the following average composition:

| | |
|---|---|
| Color | Water white |
| Bromine No | 0.5 to 1.3 |
| Gravity at 20°/20° C | .810–.815 |
| Refractive index at 20° C | 1.3991–1.4000 |
| Aldehyde | 0.3 to 0.8% by wt. |
| Ester content | 0.5 to 1.0% by wt. |
| Butanol content | 97.0–99.0% by wt. |

It has been found desirable to carry out the second distillation in the presence of an added amount of water. When the distillation is so conducted, the aldehydes in the hydrogenation product are concentrated in the first fractions and thus may be recycled in the process. Improvement is also obtained in the total content of unsaturates. This is illustrated in the following comparative distillations as a control, one portion of a sample of hydrogenated product having the following analysis:

| | |
|---|---|
| Bromine number | 1.5 |
| Percent aldehyde | 1.8 |
| Percent ester | 2.7 |
| $N_D^{20}$ | 1.4011 |
| Sp. gr. 20/15.5 | 0.817 | was distilled as received. Another equal portion was distilled after 5% water had been added. The concentration of aldehydes and unsaturates in the first fractions is clearly illustrated by the data given in the following table:

| Cut No. | Percent of Total | | Alcohol | | Aldehyde | | Bromine No. | |
|---|---|---|---|---|---|---|---|---|
| | Control | H₂O Added | Control | H₂O Added | Control | H₂O Added | Control | H₂O Added |
| 1 | 10.0 | 9.5 | 72 | 55 | 6.5 | 10.0 | 0.1 | 3.0 |
| 2 | 10.0 | 9.5 | 94 | 93 | 1.7 | 1.9 | 0.1 | 0.0 |
| 3 | 10.0 | 9.5 | 95 | 95.5 | 1.5 | 1.4 | 0.0 | 0.05 |
| 4 | 10.0 | 9.5 | 95 | 96.5 | 1.2 | 0.9 | 0.0 | 0.05 |
| 5 | 10.0 | 9.5 | 95.5 | 96.5 | 1.0 | 0.7 | 0.0 | 0.05 |
| 6 | 10.0 | 10.5 | 96.5 | 96.5 | 0.9 | 0.5 | 0.0 | 0.2 |
| 7 | 10.0 | 9.5 | 97.0 | 97.0 | 0.7 | 0.2 | 0.1 | 0.0 |
| 8 | 10.0 | 9.5 | 97.5 | 98.0 | 0.2 | 0.2 | 0.2 | 0.0 |
| 9 | 10.0 | 9.5 | 97.5 | 97.5 | 0.2 | 0.2 | 0.0 | 0.0 |
| 10 | 7.2 | 6.9 | 85.0 | 98.0 | 3.8 | 0.5 | 1.0 | 0.0 |

The amount of water may be varied up to about 30%.

While we have illustrated our invention with reference to a particular embodiment thereof, it will be understood that variation may be made therein without departing from the spirit and scope of the invention.

The hydrogenation is most suitably carried out as a liquid phase hydrogenation in which the liquid phase flows down over the catalyst at a reactive temperature below the boiling point of the butanol fraction and at a moderate pressure. At atmospheric pressure the temperature should not exceed about 115–117° C. depending upon the purity of the butanol fraction. At 50 pounds per square inch gauge, the temperature suitably may range from 110–135° C. and at 100 pounds per square inch gauge, up to about 150° C. Under these conditions the hydrogenation reaction which is distinctly exothermic does not proceed at such a high rate as to cause any complications at reasonably high feed rates. While pressures above about 50 pounds per square inch gauge may be used, there appeared to be little advantage in using the higher pressure. Also, it does not appear that close control of the temperature is necessary as long as the feed is not vaporized. Any lower reactive temperature may be utilized but ordinarily it will not be desirable to go below about 110° C. Below this temperature the operation of the hydrogenation converter may be somewhat erratic. Temperatures between 110 and 135° C. and pressures up to 50 pounds per square inch therefore are preferred. The downward flow of the liquid over the catalyst in an atmosphere of hydrogen brings about conditions which appear to be ideal for the hydrogenation reaction in that a thin film of the liquid passes over the catalyst particles completely surrounded by hydrogen.

The rate of feed of the butanol fraction to the hydrogenation converter may be varied but should be adjusted as required to obtain a satisfactory conversion of unsaturates. For example, in a typical operation with a liquid hourly space velocity less than two, the bromine number was 0.3–0.6 whereas with a liquid hourly space velocity of 4, the bromine number was 3–6. Ordinarily a liquid hourly space velocity (the volume of liquid passed over the catalysts per hour divided by the volume of the catalyst) of one or two, will be found satisfactory but it will be understood that this may vary according to the particular characteristics of the converter. Those skilled in the art having in mind data given herein will be fully able to determine suitable feed rates.

An excess of hydrogen is maintained in the converter. This may range up to about 50% or more excess. The amount of the excessive hydrogen, however, does not appear critical as long as a definite excess is maintained.

It is important in the operation of the converter, especially where the feed is downwardly over the catalyst in an atmosphere to size or particulate the catalyst. By packing the converter with particles of catalyst of suitable size, say 2 to 10 mesh, and properly regulating the feed to prevent flooding, the liquid flows down as a thin film on the catalyst particles thereby assuring intimate association among the liquid, the hydrogen and the catalyst.

In place of the Raney-nickel catalyst, there may be substituted any suitable hydrogenation catalyst such, for example, as commercial nickel or palladium catalysts which may be purchased on the open market. It will be understood, however, that the invention is not limited to any particular catalyst.

The quality of the feed for the hydrogenation converter is important since the nature and quantity of impurities affect the operation of the converter and the purity of the product. Under the conditions of conversion which have been fully described above, unsaturated alcohols, such as crotonyl alcohol, are readily converted to the corresponding saturated alcohol but the esters remain unchanged and the higher aldehydes are not completely converted to the corresponding alcohols. Consequently to obtain a hydrogenated product with relatively high percentage of n-butanol, the crude butadiene residue should be carefully fractionated first in order to obtain a butanol fraction which is relatively free of esters and aldehydes. It is desirable therefore to effect a primary distillation in a still having fractionating capacity adequate to produce a butanol fraction boiling within the range of 115 to 123° C. Those skilled in the art, having in mind the purpose of the distillation, will readily be able in view of the illustrative data given above to provide suitable distillation apparatus and to effect the distillation in accordance with the spirit and scope of the invention. Thus it is within the scope of the invention to carry out the distillation as a continuous operation as illustrated or as a discontinouus operation in a batch still with variable conditions of temperature, pressure and reflux ratios as may be suitable to obtain a fraction boiling substantially as n-butanol. The primary distillation may be carried out dry or in the presence of water.

When the primary distillation is conducted to give a butanol fraction having a boiling range between 115 and 123° C., the hydrogenated product is generally water white with low bromine number indicating the absence of double bonds. The alcohol content is approximately that of the feed. The ester content is about the same as the feed and aldehyde in the product is lower than in the feed. The principal improvement brought about by hydrogenation is in the elimination of unstable color-forming compounds and the conversion of crotonyl alcohol and butyraldehyde to butanol. The densities and refractive indices of the hydrogenated product are usually slightly higher than the values for pure n-butanol. The boiling range in most cases is somewhat wider than the feed. This change in boiling range is largely proportional to the impurities present, thus a feed stock containing only crotonyl alcohol and butanol could be hydrogenated without any appreciable widening of the boiling range.

While theoretically it would be possible to recover n-butanol from crude butadiene residue by distillation, it is not practical to do so. This distillation would have to be carried out either with steam or with reduced pressure in order to prevent thermal decomposition. Under such conditions it is quite tedious to recover narrow boiling, high purity fractions. Moreover, only the n-butanol content of the crude would be recovered. Consequently, in taking a wider boiling cut, say 115 to 125° C., and hydrogenating it in accordance with the invention, decided advantages in economy of operation and yield are obtained.

The final distillation is not critical but may be carried out in accordance with the usual distillation practices. It may be noted though that the conditions of the second distillation are determined largely by the conditions of the first. Thus the more broadly the cut is taken in the first distillation, then the more carefully must the hydrogenation product be fractionated in the second distillation to obtain specification grade butanol. It will be understood, however, that while the processes of the invention are distinctly advantageous in that they admit in the product a specification grade butanol, the invention is not limited in this respect and that the final distillation may be eliminated and the crude distillation product utilized for such purposes as it may be suited.

We claim:

1. In a process for the recovery of n-butanol from butadiene residue the steps of subjecting crude butadiene residue to fractional distillation, isolating a fraction containing substantially all of the n-butanol and crotonyl alcohol of said crude, passing said fraction over a hydrogenation catalyst at a reactive temperature below the boiling point in contact with hydrogen and subjecting the hydrogenation product to fractional distillation, separating the hydrogenation product by fractional distillation into a low boiling fraction, an intermediate fraction, a fraction boiling substantially as n-butanol and a bottoms fraction, returning the low boiling fraction and the bottoms fraction to the first distillation, returning the intermediate fraction to the hydrogenation and isolating the fraction boiling substantially as n-butanol.

2. In a process for the recovery of n-butanol from butadiene residue the steps of subjecting crude butadiene residue to fractional distillation, isolating a fraction containing substantially all of the n-butanol and crotonyl alcohol contained in said residue having a boiling range within the limits of 115° to 125° C., passing said fraction over a nickel catalyst in contact with hydrogen at a temperature below the boiling point of said fraction between about 110° and 135° C. and subjecting the hydrogenation product to fractional distillation, separating the hydrogenation product by fractional distillation into a low boiling fraction, an intermediate fraction, a fraction boiling substantially as n-butanol and a bottoms fraction, returning the low boiling fraction and the bottom fraction, returning the low boiling fraction and the bottom fraction to the first distillation, returning the intermediate fraction to the hydrogenation and isolating the fraction boiling substantially as n-butanol.

LESLIE W. ROYER.
ROBERT LOUIS IVERSON.

REFERENCES CITED

The following references are of record in the file of this patent:

UNITED STATES PATENTS

| Number | Name | Date |
|---|---|---|
| 996,328 | Guillaume | June 27, 1911 |
| 1,964,000 | Lazier | June 26, 1934 |
| 2,276,142 | Atwood | Mar. 10, 1942 |

OTHER REFERENCES

Chemical Abstracts, vol. 29, column 3299 (1935).